March 29, 1960  H. J. BRITTON  2,930,575
ROTARY VALVE AND SEAT CONSTRUCTION
Filed Aug. 26, 1957

INVENTOR.
HARRISON JOHN BRITTON
BY
Kenyon & Kenyon
ATTORNEYS

United States Patent Office 2,930,575
Patented Mar. 29, 1960

2,930,575

ROTARY VALVE AND SEAT CONSTRUCTION

Harrison John Britton, Cedar Grove, N.J., assignor to Hydromatics, Inc., a corporation of New Jersey Application August 26, 1957, Serial No. 680,112

1 Claim. (Cl. 251—174)

This invention relates to a rotary valve and seat construction adapted to control the flow or passage of various gaseous or liquid media under wide ranges of pressure and temperature conditions.

In applications where it is desired to control the flow or passage of various media under relatively low pressures and normal temperatures the piston or poppet type valve has proven entirely satisfactory. There are many applications, however, where these prior art valves have proven unsatisfactory as, for example, under high pressures and over wide temperature ranges. The difficulties that have been encountered when using this type of valve under these conditions are pounding of the valve seats when the valves are operated due to the high pressure resulting in leakage, and the force required to activate the valve when the valve seat is subjected to high pressure. Other disadvantages are unreliability under extreme temperature conditions due to sticking and jamming which interferes with the reciprocating motion of the valve, and leaks which result from the valve leaving its seat due to obstructions which are encountered during operation. Although these disadvantages are well known, these types of valves have been utilized for lack of better constructions in applications where extreme operating conditions are encountered although such use has been unsatisfactory.

In view of the foregoing it is one object of the present invention to provide a rotary valve and seat construction in which the valve and seat are always in sealing contact irrespective of operational environment.

Another object of this invention is to provide a valve of the spherical ball type which may be operated easily by application of a small torque under wide extremes of pressure and temperature.

A further object of this invention is to provide a rotary valve and seat arrangement which permits a straight unobstructed flow with relatively no pressure losses and no turbulence.

Yet another object of this invention is to provide a valve of the spherical ball type in which the pressure of the liquid forcing the seat against the ball are counterbalanced by forces tending to move the seat away from the ball, the seat being held against the ball only by spring action.

These and further objects of the invention will be more clearly understood from the following description and from the accompanying drawings in which.

The rotary valve and seat construction of the present invention includes a spherical ball member positioned within a housing having inlet and outlet ports which in one position of the ball member are in alignment with a through passageway provided in the ball. In one form of the invention the ball member is rotatable about a vertical axis and movable laterally about a horizontal axis, or in other words axially with respect to the aligned ports in the housing. The ball is maintained in a permanent contact with annular valve seats concentric with the inlet and outlet ports in the housing. The valve seat adjacent the outlet port is stationary while the valve seat adjacent the inlet port is spring-biased toward the ball member. In this manner the spring-biased valve seat always forces the ball along said horizontal axis toward the outlet port and into sliding sealing engagement with the stationary valve seat at the outlet port, thereby maintaining the ball in permanent slidable sealing contact with the valve seat at the outlet port.

Figure 1:
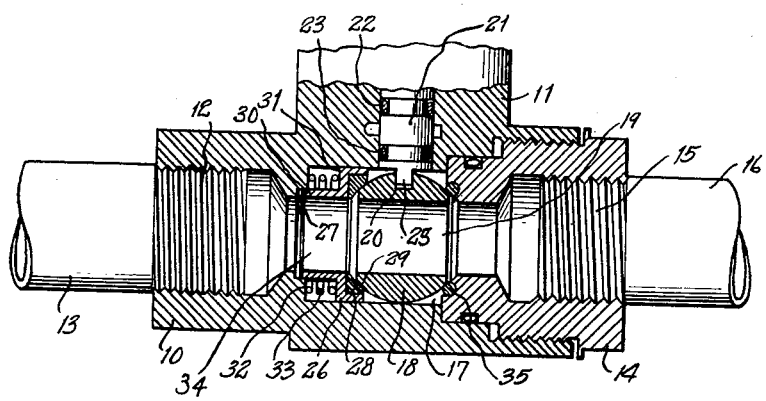
Figure 1 is a vertical longitudinal cross-sectional view of a valve construction illustrating one embodiment of the invention.

Referring now to the drawings, and particularly to Fig. 1, the valve arrangement comprises a hollow casing 10 that is substantially rectangular with a cylindrical extension 11 projecting from one side. The valve casing 10 is provided with an inlet port 12 which is adapted to be connected to a supply line 13 in any suitable manner, such for example as by threading to the female threads in the casing which are complementary to the male threads on the outer surface of the supply line. The valve casing 10 may take any desired form in order to meet various space requirements and to facilitate assembly of the valve parts, but in the form shown includes a removable plug 14. This plug 14 may be secured to the valve casing 10 in any desired manner and is illustrated as being threadably secured to the latter. The plug 14 is formed with an outlet port 15 which is provided with a threaded female end for convenient connection to an external line 16. The inlet and outlet ports are so situated and disposed that they are in axial alignment and preferably have cylindrical sections.

The hollow portion or recess 17 of the valve housing 10 is adapted to receive the ball member 18 which is preferably spherical in shape. The ball 18 is provided with a transverse through passageway 19 which serves to provide free communication between the inlet and outlet ports of the valve housing when the valve is in its operative or open position. The passageway 19 is preferably cylindrical in shape and of the same diameter as the ports 12 and 15 and the inside diameter of the lines 13 and 16.

The ball 18 may be retained within the valve housing 10 by any suitable means subject only to the requirement that the ball be rotatable only about an axis perpendicular to that between the ports in one form of the invention, and in another form of the invention be movable both rotatably about said axis and also along the port axis. In the embodiment illustrated in Figure 1, the ball 18 is movable along both axes and is therefore termed a floating ball. This is accomplished by providing a keyway or slot 20 in the surface of the ball. The keyway 20 is at right angles to the longitudinal axis of the passageway 19 such that the ball is forced to move axially with respect to the ports 12 and 15 when the valve is in its inoperative or closed position in a manner and for a purpose to be presently described.

Figure 2:
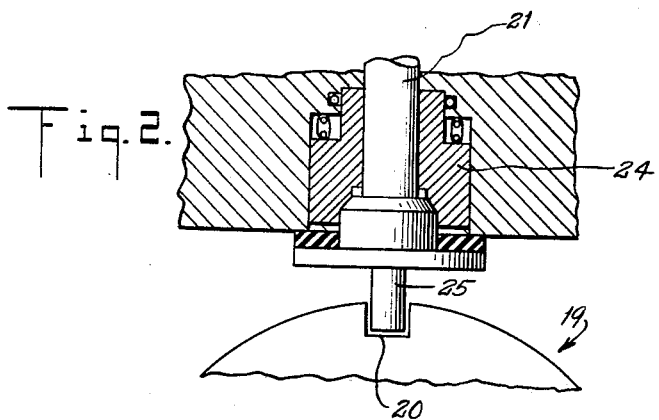
Figure 2 is a vertical longitudinal cross-sectional view of a portion of the valve illustrated in Figure 1 but with a different shaft seal.

An operating stem 21 is positioned in the extension 11 such that it is in alignment with the first-named axis of the ball 18. This stem 21 is rotatable in the extension 11 and is annularly surrounded by shaft seals 22 and 23 to prevent leakage of liquid between the stem 21 and the inner surface of the extension 11. The shaft seals 22 and 23 may be of the lip type where the valve is utilized in applications to control the flow of corrosive or low temperature fluids, of the O ring type or of the bellows or diaphragm type or any other conventional type. In the preferred form illustrated in Figure 2 a plastic face seal arrangement 24 is utilized in place of the shaft seals 22 and 23 to decrease the frictional force between the stem 21 and the extension 11. With this latter arrangement the torque required to rotate the stem 21 is appreciably decreased. This facilitates the use of low torque rotary devices such as rotary solenoids to operate the valve which heretofore have been found impractical in high pressure applications.

The lower portion of the stem 21 extends within the recess 17 in the valve housing 10 and has a key 25 which is adapted to be slidably engaged in the keyway 20 in the ball 18. The key 25 is of such dimensions that when it is engaged in the keyway 20 the ball is free to slide in a direction perpendicular to the longitudinal axis of the stem 21.

The ball retainer at the inlet port 12 is denoted generally by the numeral 26 and is removably and slidably received in the valve casing 10 as, for example, its motion being limited in one direction by the shoulder 27 provided in the valve casing. Integral with the forward end of the valve seat 26 is an annular insert ring 28. This ring 28 is provided with a seat 29 which is substantially complemental in shape to that of the spherical surface of the ball 18 and is adapted to engage the ball in a slidable relationship. The material of ring 28 and seat 29 is preferably a material with a low coefficient of friction, such for example as plastic. The ball retainer 26 has an axially extending cylindrical flange 30 defining an annular shoulder 31. The valve casing 10 adjacent the shoulder 27 has a stepped portion providing an annular flange or shoulder 32 which is axially spaced from the shoulder 31 of the ball retainer 26 when the ball retainer is in position. A biasing spring member 33 is mounted on the flanged portion 30 and between the shoulders 31 and 32. The spring member resiliently forces or biases the ball retainer 26 axially toward the ball 18. The ball retainer 26 has a longitudinal cylindrical passageway 34 of the same diameter as the ports 12 and 15 and passageway 19 in the ball 18 and is alignable with the latter in one position of the ball 18. As illustrated in Figure 1, the ball retainer 26 is positioned between the inlet port 12 and the ball 18.

The inner end of the plug 14 is provided with a valve seat 35 substantially complementary to the surface of the ball 18 and adapted to engage the ball in a sliding sealing relationship. The valve seat 35 is normally maintained in a fixed position in sliding and sealing contact with the ball 18. This valve seat is of material similar to that of ring 28 and both are selected from materials which have long life under extremes of operating conditions.

Figure 3:
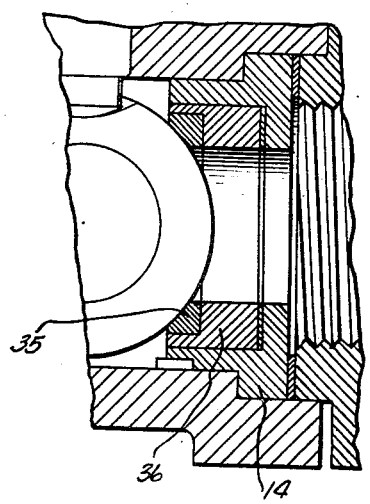
Figure 3 is a vertical longitudinal cross-sectional view of a portion of the valve illustrated in Figure 1 but with a different valve seat arrangement.

Under normal operating conditions the valve seat 35, if constituted by a material such as plastic, will be maintained in sliding sealing contact with the ball 18. In low temperature applications, however, the plastic material of valve seat 35 will contract at a rate greater than that of the metallic material constituting the plug 14. When this occurs the valve seat 35 is no longer in sliding sealing engagement with the ball 18. For applications of this type therefore the valve seat arrangement depicted in Fig. 3 is utilized. As illustrated in this figure, an insert 36, fabricated from material such as "Invar," with a lower coefficient of contraction than the plastic valve seat 35 and the plug 14 is interposed between the valve seat and plug. The insert 36 compensates for the difference between the coefficient of contraction of the plug and the valve seat, thereby maintaining the valve seat 35 in sliding sealing contact with the ball 18.

In assembling the valve construction illustrated in Figure 1, the ball retainer 26 with the annular spring 33 positioned on its flange 30 is first inserted in the valve casing 10 through the opening provided in the outlet side of the casing 10 by the removal of the plug 14. The ball member 18 is next inserted as well as the stem 21 such that the keyway 20 in the ball 18 is engaged by the key 25 on the stem 21. The plug 14 is next threaded into the casing 10 until the valve seat 35 engages the ball 18.

In operation the insert ring 28 is maintained in sliding contact with the ball 18 by bearing force of the spring 33. When the valve is in the closed or inoperative position and fluid pressure is applied to the inlet port, this pressure is exerted on the area of seat 29 thereby creating a force acting on the ball. The combination of these forces, or the force of the spring 33 alone, is such that the ball 18 is biased into sliding and sealing contact with the valve seat 35. It is therefore apparent that the ball surface and seat member is always maintained in sliding and sealing contact, and consequently during opening and closing cycles the sealing elements are subjected by the ball to a self-wiping, self-lapping action which insures long and maintenance-free life for the valve.

It is to be understood that the valve seat and sealing means described may be utilized as well at both the outlet and inlet ports if desired. An arrangement of this type with valve seat and sealing means at both the outlet and inlet ports is utilized in applications where the valve is periodically required to regulate or control flow in alternate directions. In addition, although the ball member has been described with reference to one passageway, it is to be understood that several interconnecting passageways may be provided to connect to the other sources of supplies. With this arrangement the flow from the inlet port may be directed to the outlet port or vented to the atmosphere simply by rotating the ball member. In a similar manner a plurality of passageways may be provided in the ball member to control or regulate the flow from several different sources or to combine the flow from these sources in any desired manner.

The valve may be manually operated or electrically controlled through solenoid operated means, details of which are not part of the instant invention. It is also to be understood that although the invention has been described with reference to one specific embodiment, valves of the type described may be operated in tandem or series as required. Other variations and designs may be made without departing from the scope of the invention except as defined in the following claim.

I claim:

A valve comprising a housing containing inlet and outlet ports having a common axis, a body in said housing rotatable about an axis perpendicular to the axis of said ports, said body containing a passage registrable with said ports and having a spherical peripheral portion, a tubular pressure member interposed between said inlet port and said body and slidably engaging said housing for axial movement therein, a plastic sealing element carried by said member engaging said spherical portion of said body, said pressure member having opposed surfaces of dissimilar areas communicating with said inlet port, a spring interposed between said housing and member biasing said sealing element towards said body, and means fixed relative to said housing restraining said body against axial movement in a direction away from said sealing element, said means including a sealing member having a predetermined coefficient of expansion engaging said body, and a member having a coefficient of expansion varying as an inverse function of that of said sealing member interposed between said sealing member and housing maintaining said sealing member in sealing engagement with said body over a wide range of temperatures.

References Cited in the file of this patent

UNITED STATES PATENTS

| | | |
|---|---|---|
| 1,584,600 | Black | May 11, 1926 |
| 1,616,386 | O'Stoske | Feb. 1, 1927 |

(Other references on following page)

UNITED STATES PATENTS

| | | | |
|---|---|---|---|
| 1,670,691 | Riggin | May 22, | 1928 |
| 1,770,900 | Dawson | July 22, | 1930 |
| 2,475,702 | Funke | July 12, | 1949 |
| 2,610,300 | Walton | Sept. 9, | 1952 |
| 2,695,628 | Wheildon | Nov. 30, | 1954 |
| 2,698,731 | Koehler | Jan. 4, | 1955 |
| 2,751,185 | Shand | June 19, | 1956 |
| 2,800,295 | Thomas | July 23, | 1957 |
| 2,839,074 | Kaiser | June 17, | 1958 |

FOREIGN PATENTS

| | | | |
|---|---|---|---|
| 166,481 | Great Britain | July 21, | 1921 |
| 883,374 | Germany | July 16, | 1953 |
| 1,072,917 | France | Mar. 17, | 1954 |